United States Patent [19]

Dehm

[11] Patent Number: 4,604,248

[45] Date of Patent: Aug. 5, 1986

[54] CHEMICAL CASE BOND SYSTEM WITH AZIDO COMPOUND BONDING

[75] Inventor: Henry C. Dehm, Salt Lake City, Utah

[73] Assignee: Hercules Incorporated, Wilmington, Del.

[21] Appl. No.: 697,094

[22] Filed: Jan. 31, 1985

[51] Int. Cl.$^4$ ............................................. C06B 21/00
[52] U.S. Cl. .................................. 264/3.1; 102/291; 149/14; 156/307.3
[58] Field of Search ................ 264/3 R, 3 B, 3 C, 3.1, 264/3.2, 3.3; 102/291; 156/307.3; 149/14

[56] References Cited

U.S. PATENT DOCUMENTS

| | | | |
|---|---|---|---|
| 3,284,421 | 6/1963 | Breslow | 260/80.5 |
| 3,507,114 | 11/1967 | Webb | 60/39.47 |
| 3,657,047 | 9/1969 | Breslow | 156/322 |
| 3,716,604 | 5/1967 | Dehm | 264/102 |
| 3,754,973 | 8/1971 | Spurlin | 117/72 |
| 3,813,308 | 3/1969 | Skidmore | 149/109 |
| 3,814,657 | 6/1974 | Haynes | 161/144 |
| 3,849,230 | 11/1972 | Breslow | 156/330 |
| 3,859,261 | 12/1972 | Breslow | 260/79.3 |
| 3,904,715 | 9/1975 | Sieg et al. | 264/3 R |
| 3,999,382 | 12/1976 | Clifford et al. | 264/3 C X |
| 4,042,441 | 5/1976 | Wasserman | 156/306 |
| 4,232,608 | 12/1978 | Wrightson | 102/103 |
| 4,247,494 | 1/1981 | Carter | 264/3 R |
| 4,429,634 | 2/1984 | Byrd et al. | 264/3 R X |
| 4,483,978 | 11/1984 | Manser | 149/88 X |

OTHER PUBLICATIONS

Urbanski, *Chemistry & Technology of Explosives*, vol. 3, Chapter IV, Pergamon Press, London, 1967.

*Primary Examiner*—Peter A. Nelson
*Attorney, Agent, or Firm*—Edmund C. Ross, Jr.

[57] ABSTRACT

A method of bonding propellant to a rocket motor casing using the nitrene insertion reaction is disclosed.

32 Claims, No Drawings

CHEMICAL CASE BOND SYSTEM WITH AZIDO COMPOUND BONDING

This invention relates to bonding solid propellants to the lining of rocket motor cases and, more particularly, to an improved method for chemically bonding solid propellants to an insulator material.

In the propellant field and, more particularly, in solid rocketry, it is oftentimes necessary to bond the propellant grain to an insulator as, for example, to the elastomeric lining of a rocket chamber. Unless the propellant grain is securely held in the chamber throughout motor firing, nozzle blockage, unpredictable variations in burning surface, overpressure and case rupture can occur. It is therefore necessary to maintain between the propellant and the internal insulator a bond which has sufficient strength to prevent propellant separation during handling, storage and firing of the motor.

The major problem in obtaining good adhesion between the propellant and the insulator concerns the bonding of two dissimilar materials, the propellant grain and the insulator. Various materials and systems have been and continue to be developed to achieve and improve this bonding. For example, in one system the propellant has been held in place by nylon "loops" attached to the insulator surface; and in another system, "fingers" of propellant have been embedded in a thick film of epoxy resin applied to the insulator surface. Still another system is the "liner case bond" system which utilizes a primer, barrier coat and a liner. In this system, the insulator is coated with a polyurethane primer of about 0.5 mils, a polyurethane barrier coat of about 4–5 mils and a hydroxy terminated polybutadiene liner composition of about 15–20 mils.

Although the aforementioned systems provide a reasonable degree of adhesion, the propellant to insulator bond is still susceptible to rupture. In some cases, bond degradation may occur due to migration of the propellant plasticizers. Moreover, these systems, because of the considerable amount of inert weight required, reduces range and/or payload that can be carried by the rocket motor. Still further, such systems are complex, time consuming and expensive. There remains, therefore, a great need for a simple, inexpensive, low inert weight and reliable method for bonding solid propellant to an insulator surface. To fill this need chemical case bonding techniques have been developed. Among the examples of chemical case bonding are those in the following U.S. Pat. Nos.: 3,507,114; 3,716,604; 3,813,308; 4,042,441; 4,187,215; 4,232,608; and 4,328,281. U.S. Pat. No. 3,507,114 discloses use of a liner made from hydroxy terminated polybutadiene and isocyanate in bonding propellant to rocket motor cases. U.S. Pat. No. 3,716,604 discloses use of polyfunctional materials in treating the surface of an uncured insulator and subsequently curing the insulator to provide sites for chemically bonding the propellant thereto. U.S. Pat. No. 3,813,308 discloses a process for bonding a carboxy containing liner for a cast composite propellant to the rocket motor insulator wherein an organic polyisocyanate is first applied to the surface of the insulator, then an uncured carboxy-containing rubber is applied and cured to provide a bondable liner for the insulation. U.S. Pat. No. 4,042,441 discloses preparation of a bondable liner through addition to the uncured precursor thereto of an insoluble, long chain polymer containing a group that is reactive with the propellant. The liner then can be bonded to the propellant. U.S. Pat. No. 3,716,604, 4,187,215, 4,232,608 and 4,328,281 each disclose use of isocyanates in bonding propellants to rocket motor casings.

This invention differs from the aforementioned bonding techniques in that the nitrene insertion reaction is used to graft to the insulator polymer (on the insulator surface) compounds or polymers that contain functional groups that react with the propellant crosslinker. During propellant cure the propellant binder polymer becomes bonded to the insulator polymer.

Generally, this invention may be characterized as a method of bonding a solid propellant to the inner surface of a cured elastomeric insulator carried by a rocket motor chamber, the solid propellant being solidified by crosslinking propellant ingredients of the solid propellant with a polyfunctional propellant crosslinker dispersed throughout the ingredients, the method comprising: (a) applying a thin film to said inner surface, the film comprising an azido composition selected from the group consisting of (i) a polyfunctional azido compound or polymer that additionally has crosslinker reactive functionality that is reactive with the polyfunctional propellant crosslinker, (ii) a polyazido compound or polymer and a polyfunctional graftable compound or polymer having (a) functionality that is reactive with azido functionality of the polyazido compound or polymer as well as (b) crosslinker reactive functionality that is reactive with the polyfunctional propellant crosslinker and (iii) a combination of (i) and (ii); (b) exposing the film to sufficient energy in the form of heat or light or a combination thereof to cause azido functionality of the azido compositions to react with the insulator and graft the crosslinker reactive functionality to the elastomeric insulator; (c) placing uncured propellant that contains the propellant crosslinker and solidifies into the solid propellant upon curing thereof in contact with the grafted surface; (d) curing the propellant such that the propellant crosslinker reacts with the functionality that is reactive therewith and bonded to the insulator inner surface thereby bonding the insulator polymer to the solid propellant binder polymer.

This invention in preferred embodiments relates to a method of bonding a solid propellant to the inner surface of a cured insulator carried by a rocket motor casing, the preferred method comprising: (a) applying a thin film of liquid to the inner surface of the cured insulator, the liquid consisting essentially of a volatile solvent, an azido compound having at least two azido groups and a graftable compound or polymer reactive with azido functionality and bearing a plurality of propellant crosslinker-reactive functional groups (the compound or polymer which is grafted to the insulator polymer is herein referred to as the graft material); (b) removing the solvent, leaving behind the azido compound and graft material as a thin, homogenous film (herein referred to as the insertion film); (c) exposing the insertion film to such conditions as heat or light that cause grafting of the graft material to the insulator surface so as to provide a bondable inner surface carrying a plurality of crosslinker reactive functional groups; (d) placing an uncured propellant slurry comprising a crosslinker in contact with the bondable inner surface carrying the plurality of crosslinker reactive groups; and (e) curing the uncured propellant in place under conditions that cause the propellant binder polymer to become bonded to the insulator polymer Examples of graft materials are hydroxy functional, carboxy functional and amine functional materials. Polyol graft materials are suitable when the propellant crosslinker is a polyisocyanate. Graft materials having a plurality of carboxyl groups are suitable when the propellant crosslinker is a polyepoxide.

Polyamines are particularly attractive graft materials not only because grafted primary amine groups react with both polyisocyanate and polyepoxide propellant crosslinkers but also because they react much faster than either hydroxyl groups with isocyanate groups or carboxyl groups with epoxy groups.

Unfortunately grafting polyamines via the nitrene insertion reaction is hampered by two unwanted competing reactions:*

*See "Nitrenes", edited by W. Lwowski, Interscience Publishers, N.Y. (1970) pg. 208.

(1) Decomposition of the azidoformate via displacement of the azide group:

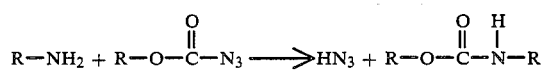

(2) Insertion into the amine group:

In order to provide an insulator surface with chemically bonded, pendant isocyanate-reactive and epoxy-reactive amine groups I have shown that polyisocyanates such as Upjohn's PAPI and Mobay's N-100 can be cleanly grafted via the nitrene insertion reaction to an insulator surface and that the resulting pendant isocyanate groups can be converted readily to pendant primary amine groups via interaction with water. Moist air is particularly effective:

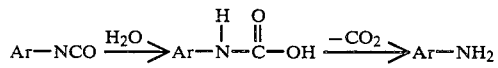

While isocyanate groups pendant from the insulator surface would give a chemical case bond directly with isocyanate-crosslinked propellant, they have no advantage over pendant hydroxyl groups and would have to be protected from moisture in order to prevent conversion to pendant amine groups.

This invention is useful when applied to any insulator surface that is reactive toward singlet nitrene intermediates, including insulators comprising polymers that contain hydrogen bonded to carbon. Among the polymers which are suitable in making insulators for rocket motor casings for this invention are ethylene/propylene/diene monomer (EPDM) elastomers, styrene butadiene elastomers, natural rubber, polychloroprene, chlorosulfonated polyethylene and polyurethane.

The insulator can be fabricated by a number of techniques. For example, uncured insulator stock can be wound in strips around a mandrel or uncured insulator sheet stock can be layed up on a mandrel and a composite case wound over the layed up, uncured insulator. The insulator and composite can be then cured together and the mandrel removed in forming the rocket motor casing that carries the cured insulator. Moreover, uncured insulator can be placed on an inflatable mandrel and the mandrel inflated within a preformed rocket motor case and cured to provide the rocket motor casing. In other cases the insulator is cured in a 2-piece mold and placed on a mandrel. The composite case is then wound over the insulator-covered mandrel and cured.

Preferred practice of this invention comprises using a liquid comprising graft material and azido compound to prepare a bondable surface on the cured insulator. In this practice a liquid comprising the azido compound, the graft material and liquid carrier is applied to the inner surface of the cured insulator in the rocket motor casing. The liquid has a viscosity suitable for spraying, brushing, rolling or the like to the inner surface. Viscosities between about 3 and 300 centipoise at 25° C. are suitable but thixotropic compositions may be used as well. The liquid is applied to the elastomeric inner surface of the rocket motor case such that it is preferably between about 0.1 1μm and 50 μm thick, more preferably between 0.1 μm and 25 μm thick.

Suitable volatile carriers are low boiling solvents and diluents for the azido and graft materials. Examples of such solvent and diluents are acetone, methyl ethyl ketone, methyl isobutyl ketone (MIBK), diethyl ketone, methyl and ethyl acetate, tetrahydrofuran, benzene, toluene, methylene chloride, 1,1-dichloroethane, 1,1,1-trichloroethane, and mixtures thereof.

Once the liquid is applied to the inner surface of the cured insulator, the volatile carrier is allowed to evaporate or is evaporated in a stream of warm air at temperatures up to about 60° C. After the volatile carrier is removed, the insertion film of the azido and graft materials, preferably between about 0.01 μm and 10 μm thick, remains on the inner surface of the cured insulator. For a purely thermal insertion, any film thickness from a monolayer to over a mil is suitable. Very thin films are preferred when UV light is used to catalyze the insertion reaction because the reaction rate is photon limited and thick films tend to become opaque to UV light. Cured films thicker than about one mil are less suitable because the evolved nitrogen may become entrapped in the grafted film.

Films 0.4 to 4 μm thick are best for thermal insertion from the standpoint of surface analysis using attenuated total reflectance spectroscopy. Films about 3 μm thick are easily obtained by applying with a paint brush a solution of 2.5 parts of a diazidoformate such as bis(β-azidoformyloxyethyl) isophthalate, marketed as Hercules, Inc. S-3060, 2.0 parts of a polymeric polyol such as Eastman's cellulose acetate butyrate (CAB) type 551-01 and 16.75 parts of solvent such as methylisobutylketone (MIBK) and allowing the solvent to evaporate. With a solution made up of 2 parts of diazidoformate, 5 parts of CAB and 45 parts of MIBK, the dried films made in this manner are about 2 μm thick. With 2.5 parts of diazidoformate, 1 part of CAB and 7.5 parts of MIBK the dried films are about 13 μm thick. With proper dilution essentially any dry film thickness from about 0.1 μm to 25 μm can be easily obtained. The aforementioned parts are parts by weight.

The viscosity of the solution and in turn the thickness of the dried insertion film is a function of the molecular weight of the graft material and polyazidoformate employed.

When the insertion film is applied by spraying, the thickness of the film can be controlled by controlling the dilution of the insertion film ingredients and by varying the number of spray passes. With a solution made by weight of 2.5 parts of the diazidoformate, 2.0 parts of CAB and 22.5 parts of MIBK, a dried film about 2-3 μm thick is obtained after one pass with a Binks Model 18 sprayer. The thickness of films greater than about 1 μm are conveniently measured using the Leitz Ortholux-Pol research microscope. The thickness of thinner films is conveniently and effectively measured using an electron microscope.

Case bonding systems used previous to this invention typically required buffing the insulator surface in order to increase the surface area. Buffing is a time consuming and difficulty controlled hand operation using a power tool; poor quality buffing results in the rejection of a significant percentage of expensive chambers. Insulator buffing is not required with the nitrene insertion graft; only a surface degreasing step is optionally employed.

The preferred manner in which to apply the insertion film in accordance with this invention is to first degrease the insulator surface with a small amount of the insertion chemicals (azido and graft materials) dissolved in the degreasing solvent used in the final wash.

The insertion graft reaction that provides the insulator surface with crosslinker-reactive functional groups, which is the basis of this case bond system, is believed to involve reactions such as shown in Table A.

As depicted in Table A energy (e.g. heat, infrared radiation, UV light, electron beam, etc.) causes the azidoformate group to collapse to give a mole of nitrogen and a highly reactive singlet nitrene intermediate (I) which then inserts into any available hydrogen-carbon bond to give a urethane linkage:

TABLE A

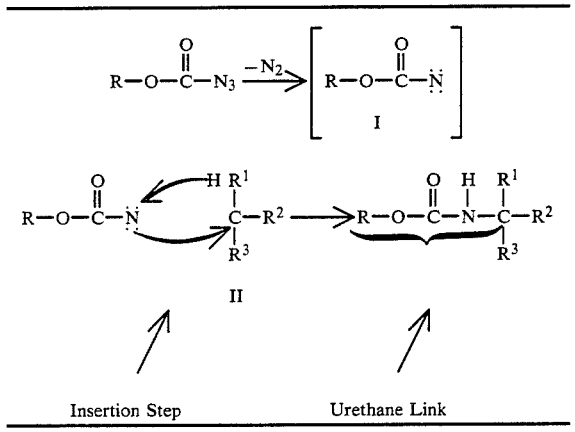

Insertion Step    Urethane Link

The C-H-containing species (structure II) can be either the insulator polymer or the graft material. When a homogenous mixture of a diazidoformate and the graft material is applied to the surface of an insulator, the insertion reaction chemically bonds the graft material to the surface, leaving chemically bonded crosslinker-reactive functional groups pendant from the insulator surface. (It is to be noted, however, that practice of the invention does not require theoretical considerations as the foregoing is not meant as limitation of this invention.)

Several means for imparting sufficient energy to cause the nitrene insertion reaction to take place are readily available and well suited for the practice of this invention. For example, when using a stream of hot air, the graft is 97% complete in 30 seconds at 180° C., in 35 minutes at 140° C. and 67 hours at 100° C. With an infrared heater such as a nichrome wire coil in a protective metal sheath, available as an Incoloy Sheath Tubular Heater from Wellman Thermal Systems Corporation) the reaction is complete in less than 30 minutes during the warm up from ambient temperature to a surface temperature of 121° C. as measured by an Omegascope 2000AS infrared surface pyrometer. Infrared heat lamps are also effective. The reaction is also promoted by the emission of the low pressure mercury vapor lamp and the high pressure xenon arc lamp.

When the diazidoformate S-3060, is employed (the azide functionality absorbs at 2027A°) an ArF laser emitting at 1930A° is very effective in promoting the reaction. The choice of laser depends on the absorption maximum for the azide group in the nitrene precursor which can vary depending on the structure of the precursor. For example, the azide groups in butane-1,4-diazidoformate absorb at 2130A; the azide groups in aliphatic sulfonyl azides such as Hercules D-63 absorb at about 2120A°. The advantage of a laser is its speed in promoting the insertion.

Polyazidoformates (especially diazidoformates) are preferred azido compounds for use in this invention. Exemplary polyazidoformates appear in U.S. Pat. No. 3,284,421 (Breslow) which is herein hereby incorporated by reference for its disclosure of polyazidoformates. See, also, U.S. Pat. No. 3,859,261 (Breslow) and U.S. Pat. No. 3,754,973 (Spurlin) in connection with polyazido compounds with other functionality. Polyazidoformates especially suitable for promoting the graft of appropriate polyols to insulator polymers include diazidoformates of diols having the structure $HO(-CH_2-)_nOH$ where n varies from 4 to about 15, the mixed diols from the hydroxymethylation of benzene, toluene, napthalene and substituted naphthalenes as well as the diazidoformate of 1,4-bis(2-hydroxyethoxy)benzene. Also useful are the triazidoformates derived from triols such as 1,1,1-tris-(hydroxymethyl)ethane, 1,1,1-tris(hydroxymethyl)propane and tris-(hydroxymethyl)nitromethane. However, these latter compounds may be expected to be shock sensitive because of the high azide concentration and should therefore be used with caution.

Examples of polyol graft materials for use in the invention include hydroxyethylcellulose, polyvinyl alcohol, hydroxypropylcellulose, and cellulose acetate butyrate. Morever, such lower molecular weight polyols as glycerol and ethylene oxide adducts thereof and 1,2,3,4-tetrahydroxybenzene are also suitable.

Compounds or polymers which have both azido and propellant crosslinker-reactive functionality are also suitable. When these compounds are used, the nitrene derived from the azido group reacts with the insulator polymer leaving the crosslinker-reactive functionality grafted to and pendant from the insulator surface. Examples of these compounds or polymers carrying both azido and propellant crosslinker functionality are: the monoazidoformates of nonpolymeric polyols such as glycerol, 1,2,3,4-tetrahydroxybutane, and mixtures thereof and the monoazidoformates and diazidoformates of sorbitol and mixtures thereof are useful. Polyazidoformates of polymeric polyols, including such polyols as polyvinyl alcohol, hydroxyethyl cellulose, hydroxypropyl cellulose and cellulose acetate butyrate are also useful, as are polyazidoformates of homopolymers derived from β-hydroxyethyl acrylate and β-hydroxyethyl methacrylate as well as two-component copolymers of these monomers with alkyl acrylates and methacrylates to dilute the pendant functionality if desired. The percentage of hydroxyl groups converted to azidoformate groups preferably does not exceed about 10 percent with the preferred percentage between about 3 to 6 percent.

Also useful are copolymers derived from the azidoformate of β-hydroxyethyl acrylate or of β-hydroxyethyl methacrylate and vinyl monomers that bear crosslinker-reactive functional groups. Such vinyl monomers include but are not limited to β-hydroxyethyl acrylate, β-hydroxyethyl methacrylate, acrylic acid and β-isocyanatoethyl methacrylate. As pointed out earlier, β-aminoethylacrylate and β-aminoethylmethacrylate are incompatible with azidoformates because the amino group displaces azide ion and also because nitrenes insert into amine groups to give unwanted products. The molar ratio of azidoformate monomer to crosslinker-reactive monomer preferably does not exceed about 1:10 and is preferably between 1:25 and 1:15.

Of the nitrene precursor groups, the azidoformate ($-O-\overset{\overset{O}{\|}}{C}-N_3$) and sulfonylazide ($-\overset{\overset{O}{\|}}{\underset{\underset{O}{\|}}{S}}-N_3$) groups are preferred. The azidoformate groups is considerably more reactive than the sulfonyl azide group. For example the thermal insertion reaction is 97 percent complete (5 half lives) in 35 minutes at 140° C. with the S-3060 diazidoformate and in about 10 hours with the 13 carbon aliphatic disulfonyl azide marketed by Hercules as product D-63. The following examples illustrate this invention but are not meant to be limitations thereof.

This invention is suitable for use with a variety of propellants, as previously mentioned. Crosslinked double base propellants, such as disclosed in U.S. Pat. No. 4,234,364 (Anderson) are preferred. U.S. Pat. No. 4,234,364 is hereby incorporated by reference for its disclosure of polyisocyanate cured propellants.

EXAMPLE 1

A 3 inch×6.5 inch×0.10 inch sample of unbuffed EPDM insulator sheet stock is degreased by rubbing with a clean rag wet with 1,1,1,-trichloroethane and is dried in a stream of 50° C. air from a commercial hair dryer type blower using a Variac to control the temperature. The sheet, at room temperature, is brush-coated with a solution made up of 1 part of bis(β-azidoformyloxyethyl)isophthalate (S-3060), 1 part of Hercules Klucel type E low molecular weight hydroxypropyl cellulose and 15 parts of acetone. The solvent is removed in a stream of 50° C. air. The voltage is then raised so that the air temperature holds at 140° C.±3° C. After 40 minutes the sample is allowed to cool to room temperature and then trimmed to 3 inch×6 inches. ATR analysis of the trimming showed that the insertion reaction is complete. The 3 inch×6 inch sample is placed in the bottom of a matching polyethylene-coated cardboard carton. A standard isocyanate-cured slurry propellant is cast against the grafted surface to a depth of one inch and cured at 120° F. The cured product is machined into standard specimens which are tested on the Instron in tension, shear and peel. In all cases the samples are determined to fail exclusively in the propellant. The controls prepared in exactly the same way, except using ungrafted sheet stock, are determined to fail exclusively at the insulator/propellant interface.

EXAMPLE 2

A rocket motor chamber 25 inches long and 10 in. ID, open at one end and with a hemispherical dome on the other end having a 3 inch diameter port is provided with an insulator made of the same EPDM rubber. The insulator is degreased, dried and coated with the diazidoformate/Klucel film as above. A stream of hot air is passed through the chamber via an adaptor attached to the 3 inch port so that the temperature of the insulator surface at the aft end of the chamber held at 140° C.±2° C. After 40 minutes the chamber is allowed to cool to ambient temperature.

A standard isocyanate-crosslinked slurry propellant is cast into the grafted chamber and cured at 120° F. The motor is fired successfully and gives the normal pressure trace. A control motor, prepared in exactly the same manner except that the insulator surface is not surface treated, is determined to fail by chamber rupture after about one fifth of the propellant is consumed.

EXAMPLE 3

An 8 inch×10 inch×0.10 inch sheet of EPDM insulator was brush coated with a solution of 2.25 parts of the S-3060 diazidoformate of Example 1, (2) parts of cellulose acetate butyrate (Eastman 551-0.1 lot BA-554) and 16.75 parts of methyl isobutyl ketone (MIBK). After the solvent is removed (in a stream of warm air) the sheet is cut into 1 inch squares and 3 inch×6 inch rectangles. The film thickness, measured using the Leitz Ortholux-Pol research microscope, is found to be about 3 um ±1 um.

The interior of a chamber similar to the one used in Example 1 is provided (double faced masking tape) with a number of the 1 inch squares (both dome and cylindrical section) and one 3 inch×6 inch sheet at the aft end of the cylindrical section.

A tight bundle of three Westinghouse G30T8-30-W low pressure mercury vapor lamps (each 36-inches long and 1 inch diameter) is positioned along the cylindrical axis. The bundle extended equally beyond the chamber ends. The lamps are turned on and periodically 1 inch×1 inch insulator samples are removed and analyzed by ATR.

After 6.5 hours the insertion is 90% complete in the cylindrical section and 70% complete in the dome. After a total of 12 hours the insertion is complete over the entire chamber surface. The temperature of a mercury thermometer lying on the bottom of the chamber throughout the insertion never exceeded 29° C.

The standard slurry propellant is cast and cured against the grafted 3 inch×6 inch surface and the specimens machined from the product are tested on the Instron in tension, peel and shear. In all cases failure is exclusively in the propellant.

EXAMPLE 4

The interior surface of a similar chamber that had been provided with the EPDM insulator is degreased and dried as described in Example 1. The insulator surface, after cooling to room temperature, is brush-coated with the same MIBK solution used to prepare the 8 inch×10 inch insulator sheet. After the solvent is removed in a stream of warm air (50°–60° C.) the same bundle of three G30T8 lamps is positioned as before and the lamps turned on. After 12 hours the lamps are turned off and removed. The chamber is cast with propellant and cured as in Example 1. This motor fired successfully; the ballistics are normal indicating that the integrity of the insulator/propellant interface is maintained.

EXAMPLE 5

A chamber similar to that used in Example 2 (provided with the same EPDM insulator) is degreased, dried, and coated as described in Example 2. A linear Wellman Incoloy Sheath Tubular Heater No. TY3141 is positioned symmetrically along the chamber cylindrical axis. This heater has a diameter of 0.315 inches and an overall length of 41 inches with a heated length of 32 inches. The output of radiant energy is 40 W/in.2 at 120 V. The dome is heated by a 5 inch diameter ring of the same material with the plane of the ring perpendicular to the chamber cylindrical axis and positioned about 2 inches from the forward end. The ends of the chamber are provided with reflective metal plates.

The voltage of the Variacs controlling the heaters are set at 120 volts and held there for 60 minutes. Previous ATR studies showed that under these conditions the insertion reaction is complete over the entire surface.

The standard isocyanate-crosslinked slurry propellant is cast into the chamber and cured in the usual manner. On firing this motor burned normally. The pressure trace indicated there is no separation at the insulator/propellant interface and no undercutting at the wall.

EXAMPLE 6

The colorless mushroom-shaped GE 120-V, 250-W 250R40/5 heat lamp used as a ceiling fixture in bathrooms is mounted vertically so that the lamp surface is 11.5 inches from the insulator surface, which is prepared as in Example 3. ATR analyses of 1 inch ×1 insulator specimens showed that the reaction is complete after 40 minutes of irradiation.

A 3 inch×6 inch insulator sample is grafted in this manner. Case bond/propellant samples prepared as described in Example 1 fail exclusively in the propellant when tested on the Instron in tension, shear and peel.

EXAMPLE 7

Example 6 is repeated exactly except that the insulator is coated with the insertion film by degreasing the surface in the usual manner and then rinsing with a solution made up of CAB (1 part), diazidoformate (1.25 parts) and methylene chloride (80 parts). The resulting case bond/propellant samples fail exclusively in the propellant when tested on the Instron in tension, shear and peel.

EXAMPLE 8

Tests are run on EPDM insulator sheet stock prepared as in Example 2 using the Orcon Model 1000 Integrated Xenon Lamphouse and Power Supply, a standard 1000-W xenon arc projection lamp commercial movie theater. The focusing lens is removed but the in a standard air-cooled housing designed for a small reflector is not. With the lamp 40 inches from the coated insulator sample and a current of 30 amps, the insertion reaction is complete (as evidenced by the loss of the 4.7 um azide band) in 2 minutes.

A 3 inch×6 inch insulator sample is grafted in this manner. Casebond/propellant samples prepared as described in Example 1 failed exclusively in the propellant when tested on the Instron in tension, shear and peel.

Set forth in Table I are the results obtained from bonding two different propellants to EPDM insulators using the procedure described above.

TABLE I

| Propellant | Case Bond System | Tensile Strength psi (2 in/min) | Shear Strength psi (200 in/min) | 90° Peel Strength psi (5 in/min) |
|---|---|---|---|---|
| 1 NEPE[1] | EA 946/ 8666.1 Embedment[2] | 84[3] | 97[3] | 13.5[3] |
| 2 NEPE[1] | S-3060[4]/ CAB[5,6] | 98[12] | 117[12] | 22.5[12] |
| 3 NEPE[1] | S-3060[4]/ CAB[5,7] | 84[12] | 116[12] | 15.3[12] |
| 4 NEPE[1] | Sulfonyl Azide[8]/ CAB[9,5] | 91[12] | 111[12] | 14.0[12] |
| 5 NEPE[1] | Sulfonyl Azide[8]/ CAB[10,5] | 94[12] | 123[12] | 14.5[12] |
| 6 NEPE | S-3060[4]/ CAB[9,5] | 105[12] | 129[12] | 12.4[12] |
| 7 Composite | S-3060[4]/ EHEC[11] | 109[12] | 155[12] | 4.2[12] |
| 8 Composite | S-3060[4]/ EHEC[11,7] | 112[12] | 197[12] | 6.0[12] |
| 9 Composite | Sulfonyl Azide[8]/ EHEC[9] | 129[12] | 172[12] | 5.7[12] |

Note:
The insulators used in all the examples of this Table I were made from ethylene-/propylene/diene monomer (EPDM) elastomer; Examples 1–4 and 7 were sulfur cured; the other were peroxide cured.
[1]Nitrate ester plasticized propellant having a binder with polyethylene glycol DOW E 4500 (molecular weight about 4500) prepolymer binder cured with N-100 polyisocyanate. Mobay; the N-100 has about 3.8–4 NCO groups/molecule.
[2]Standard epoxy embedment case bond.
[3]Failure both at the interface and in the propellant.
[4]Bis($\beta$-azidoformyloxyethyl)isophthalate made by Hercules Inc. and marketed as S-3060.
[5]Cellulose acetate butyrate from Eastman Chemical Products, Inc.
[6]Low pressure mercury vapor lamp for 12 hours with the insulator surface temperate held at 95° F.
[7]90 minutes at 250° F.
[8]A disulfonylazide (Hercules D-63)
[9]60 minutes at 330° F.
[10]Same mercury vapor lamp; 48 hours at 95° F.
[11]Ethyl hydroxethyl cellulose. Hercules low viscosity lot 8432; weight average molecular weight of 115,000 and a polydispersity of 3.4.
[12]Samples failed exclusively in the propellant.

EXAMPLE 9

Unbuffed 0.1" thick cured EPDM sheet stock coated with cellulose acetate butyrate (1 part by weight), and bis($\beta$-hydroxyethyl) isophthalate diazidoformate (Hercules S-3060; 1.25 parts by weight) was irradiated with an ArF laser emitting at 193 nm as shown in Table I-9.

TABLE II

| Film Thickness | Pulses/Position | MJ/cm$^2$ Pulse | Hz |
|---|---|---|---|
| 0.4 μm | 30 | 96 | 15 |
| 0.2 μm | 20 | 87 | 15 |
| 0.1 μm | 20 | 87 | 10 |

A standard isocyanate-cured slurry propellant was cast and cured against 3"×6" grafted sheets. Case bond samples machined from the products were tested on the Instron in tension, peel and shear. In all cases the samples failed exclusively in the propellant anywhere from 0.3" to 0.6" away from the insulator.

Window bomb firings indicated there was no tendency to undercut at the wall.

What I claim and desire to protect by Letters Patent is:

1. A method of bonding a solid propellant to the inner surface of an elastomeric insulator carried by a rocket motor chamber, said solid propellant being solidified by crosslinking propellant ingredients of said solid propellant with a polyfunctional propellant crosslinker dispersed throughout said ingredients, said method comprising
   (a) applying a thin film to said inner surface, said film comprising an azido composition selected from the group consisting of (i) a polyfunctional azido compound or polymer that additionally has crosslinker reactive functionality that is reactive with said polyfunctional propellant crosslinker, (ii) a polyazido compound or polymer and a polyfunctional graftable compound or polymer having (a) functionality that is reactive with azido functionality of said polyazido compound or polymer as well as (b) crosslinker reactive functionality that is reactive with said polyfunctional propellant crosslinker and (iii) a combination of (i) and (ii);
   (b) exposing said film to sufficient energy in the form of heat or light or a combination thereof to cause azido functionality of said azido compositions to react with said insulator and graft said crosslinker reactive functionality to the surface of said elastomeric insulator;
   (c) placing uncured propellant that contains said propellant crosslinker and solidifies into said solid propellant upon curing thereof in contact with said grafted surface applied in (b);
   (d) curing said propellant such that said propellant crosslinker reacts with said functionability that is reactive therewith and bonded to said insulator surface thereby bonding said insulator to said solid propellant binder polymer.

2. A method in accordance with claim 1, wherein said polyfunctional azido compound or polymer is selected from monoazidoformate of glycerol or 1,2,3,4-tetrahydroxybutane.

3. The method in accordance with claim 2, wherein said polyfunctional azido compound or polymer is selected from polyazidoformates of polymeric polyols.

4. The method in accordance with claim 3, wherein said polymeric polyols are selected from polyvinyl alcohol, hydroxyethylcellulose, hydroxypropylcellulose and cellulose acetate butyrate.

5. The method in accordance with claim 1 wherein said polyfunctional azido polymers are selected from polymers of azidoformate monomers and monomers of hydroxyethyl acrylates or methacrylates wherein said azidoformate and acrylate or methacrylate are at a molar ratio between 1:25 and 1:15.

6. The method in accordance with claim 1, wherein said polyazido compound or polymer is selected from azidoformates and sulfonylazides.

7. The method in accordance with claim 6, wherein said azidoformate comprises a diazidoformate.

8. The method in accordance with claim 7, wherein said polyfunctional graftable compound or polymer is selected from polymeric polyols.

9. The method in accordance with claim 8, wherein said polymeric polyol is selected from polyvinyl alcohol, hydroxyethylcellulose, hydroxypropylcellulose and cellulose acetate butyrate.

10. A method of bonding a solid propellant to the inner surface of an elastomeric insulator carried by a rocket motor chamber wherein said solid propellant is solidified by crosslinking propellant ingredients of said solid propellant crosslinker mixed with said ingredients, said method comprising:
    (a) applying a film to said inner surface, said film comprising a polyazido compound or polymer and a polyfunctional graftable compound or polymer having functionality that is reactive with azido functionality of said polyazido compound and said polyfunctional propellant crosslinker;
    (b) exposing said film to sufficient electromagnetic energy in the form of heat or light or both to cause azido functionality of said polyazido compound or polymer to react with said insulator surface and said polyfunctional graftable compound or polymer;
    (c) placing uncured propellant that contains said propellant crosslinker and solidifies into said solid propellant upon curing thereof in contact with said film applied in (b);
    (d) curing said propellant such that said propellant crosslinker reacts with said crosslinker reactive functionality of said polyfunctional graftable compound or polymer thereby bonding said insulator or polymer to said solid propellant binder polymer.

11. The method in accordance with claim 10, wherein said polyazido compound comprises a diazidoformate.

12. The method in accordance with claim 11, wherein said diazidoformate comprises bis($\beta$-azidoformyloxyethyl) isophthalate.

13. The method in accordance with claim 12, wherein said polyfunctional graftable compound or polymer comprises a polymeric polyol.

14. The method in accordance with claim 13, wherein said polyfunctional polyol comprises cellulose acetate butyrate.

15. The method in accordance with claim 10, wherein said polyfunctional graftable compound comprises a polymeric polyol selected from the group consisting of cellulose acetate butyrate, hydroxypropyl cellulose, hydroxyethylcellulose and polyvinyl alcohol.

16. The method in accordance with claim 14, wherein said polyfunctional propellant crosslinker comprises a polyisocyanate.

17. The method in accordance with claim 15, wherein said polyazido compound is selected from sulfonylazides and polyazidoformates.

18. The method in accordance with claim 16, wherein said polyazidoformate is selected from diazidoformates.

19. A method of bonding a solid propellant to the inner surface of a cured insulator carried by a rocket motor casing, said method comprising: (a) applying a liquid to the cured insulator to form a thin film of the liquid on the inner surface, the liquid consisting essentially of a volatile solvent, an azido compound or polymer having at least two azido groups and a graftable compound or polymer reactive with azido functionality and bearing a plurality of propellant crosslinker-reactive functional groups; (b) removing said solvent, leaving behind said azido compound and graft material as a thin, homogenous film; (c) exposing said film to such conditions that cause grafting of said graftable compound or polymer to the insulator surface so as to provide a bondable inner surface carrying a plurality of crosslinker reactive functional groups; (d) placing an uncured propellant slurry comprising a propellant crosslinker in contact with said bondable inner surface carrying said plurality of crosslinker reactive groups; and (e) curing said uncured propellant in place under conditions that cause said propellant crosslinker to become bonded to the insulator polymer.

20. The method in accordance with claim 19, wherein said propellant crosslinker comprises a polyisocyanate.

21. The method in accordance with claim 19, wherein said propellant crosslinker comprises a polyepoxide.

22. The method in accordance with claim 20, wherein said graftable compound or polymer comprises a polymeric polyol.

23. The method in accordance with claim 22, wherein said polymeric polyol comprises cellulose acetate butyrate, hydroxyethyl cellulose, hydroxypropylcellulose, polyvinylalcohol, or a mixture thereof.

24. The method in accordance with claim 20, wherein said azido compound comprises a diazidoformate.

25. The method in accordance with claim 20, wherein said azido compound or polymer comprises a sulfonylazide.

26. The method in accordance with claim 20, wherein said conditions that cause grafting of said graftable compound or polymer comprise exposure of said insertion film to ultra violet light.

27. The method in accordance with claim 26, wherein said conditions that cause grafting of said graftable compound or polymer comprise exposure of said insertion film to heat in the form of hot air.

28. The method in accordance with claim 26, wherein said conditions that cause grafting of said graftable compound or polymer comprise exposure of said insertion film to a mercury vapor lamp.

29. The method in accordance with claim 26, wherein said conditins that cause grafting of said graftable compound or polymer comprise exposure of said insertion film to infrared radiation including the energy emitted by a hot nichrome wire.

30. The method in accordance with claim 26, wherein said conditions that cause grafting of said graftable compound or polymer comprise exposure of said insertion film to infared radiation emitted by a nichrome coil.

31. The method in accordance with claim 25 wherein said diazidoformate comprises bis($\beta$-azidoformyloxyethyl)isophthate.

32. The method in accordance with claim 30, wherein said graftable compound or polymer comprises cellulose acetate butyrate.

* * * * *

UNITED STATES PATENT AND TRADEMARK OFFICE
CERTIFICATE OF CORRECTION

PATENT NO. : 4,604,248
DATED : August 5, 1986
INVENTOR(S) : Henry C. Dehm

It is certified that error appears in the above-identified patent and that said Letters Patent are hereby corrected as shown below:

Column 9, Between Lines 60-63     after
                                  arc projection lamp -
                        " "commercial movie theater. The
                           focusing lens is removed but the
                           in a standard air-cooled housing
                           designed for a small reflector
                           is not. "

Should read  --  in a standard air-cooled housing
                         designed for a small commercial
                         movie theater. The focusing lens
                         is removed but the reflector is not. --

Signed and Sealed this

Eleventh Day of November, 1986

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,604,248
DATED : August 5, 1986
INVENTOR(S) : Henry C. Dehm

It is certified that error appears in the above-identified patent and that said Letters Patent are hereby corrected as shown below:

Column 14, Line 10 " conditins "

should read -- conditions --

Signed and Sealed this

Twentieth Day of January, 1987

Attest:

DONALD J. QUIGG

Attesting Officer

Commissioner of Patents and Trademarks